US010834527B1

(12) United States Patent
Grubb et al.

(10) Patent No.: US 10,834,527 B1
(45) Date of Patent: Nov. 10, 2020

(54) LOCATION SERVICE BASED ON DEVICE INTERACTION DATA (71) Applicant: International Business Machines Corporation, Armonk, NY (US)

(72) Inventors: Jordan Matthew Grubb, Eastleigh (GB); Richard Pilot, Bishopstoke (GB); James Alexander Gordon, Doncaster (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/701,801

(22) Filed: Dec. 3, 2019

(51) Int. Cl.
H04W 4/021 (2018.01)
H04W 4/029 (2018.01)
(Continued)

(52) U.S. Cl.
CPC ........... *H04W 4/021* (2013.01); *H04L 63/102* (2013.01); *H04L 63/107* (2013.01); *H04W 4/023* (2013.01); *H04W 4/029* (2018.02); *H04W 12/00503* (2019.01); *H04W 12/0808* (2019.01); *H04W 64/003* (2013.01)

(58) Field of Classification Search
CPC ....... H04W 4/02; H04W 4/021; H04W 4/023; H04W 64/00; H04W 64/003
See application file for complete search history.

(56) References Cited

U.S. PATENT DOCUMENTS 9,426,769 B2   8/2016  Haro
2015/0156744 A1*  6/2015  Haro ..................... H04W 4/021
                                              455/456.1

(Continued)

FOREIGN PATENT DOCUMENTS

CA    2981391 A1    4/2019

OTHER PUBLICATIONS

Han et al., "Geolocation Prediction in Social Media Data by Finding Location Indicative Words", Proceedings of Coling 2012: Technical Papers, pp. 1045-1062, Coling 2012, Mumbai, Dec. 2012, pp. 1045-1061, <https://www.aclweb.org/anthology/C12-1064>.
Han et al., "Text-Based Twitter User Geolocation Prediction", Journal of Artificial Intelligence Research 49 (2014) 451-500 Submitted Oct. 2013; published Mar. 2014, <https://pdfs.semanticscholar.org/a908/99f0463fb5877dcf2379a5371c77d7606fe.pdf>.

(Continued)

*Primary Examiner* — Erica Navar
*Assistant Examiner* — Farideh Madani
(74) *Attorney, Agent, or Firm* — Daniel R. Simek (57) ABSTRACT Aspects of the present invention disclose a method, computer program product, and system for providing a location service. The method includes one or more processors identifying a first user performing a defined interaction on a computing device. The method further includes determining a location of the computing device during the defined interaction. The method further includes recording the determined location. The method further includes receiving a request for location information associated with the first user from a second user. The second user is authorized to access location information associated with the first user. In response to receiving the request from the second user, the method further includes determining a current location of the computing device. The method further includes generating a location status message corresponding to the first user based on the determined current location in relation to the recorded location.

17 Claims, 3 Drawing Sheets (51) Int. Cl.
*H04W 4/02* (2018.01)
*H04L 29/06* (2006.01)
*H04W 12/08* (2009.01)
*H04W 64/00* (2009.01)
*H04W 12/00* (2009.01)

(56) References Cited

U.S. PATENT DOCUMENTS

2016/0088446 A1  3/2016 Stephens
2017/0041749 A1* 2/2017 Dowlatkhah ......... H04W 4/023

OTHER PUBLICATIONS

Sandve, "A Metadata Approach to Predicting Twitter User Geolocation", Master of Science in Computer Science Submission date: Jun. 2016, 72 pps, <https://pdfs.semanticscholar.org/5862/1ef207b705ebcdd899ce0942560c08a59fa4.pdf>.

* cited by examiner

LOCATION SERVICE BASED ON DEVICE INTERACTION DATA

BACKGROUND OF THE INVENTION

The present invention relates generally to the field of location services, and more particularly to location management based on computing device interactions.

In computing, geolocation software is software that is capable of deducing the geolocation of a device connected to the Internet. The identification of a device's IP address can be used to determine the country, city, or post/ZIP code, determining an object's geographical location, etc. The Global Positioning System (GPS) is a global navigation satellite system (GNSS) that provides geolocation and time information to a GPS receiver. The GPS does not require the user to transmit data, and it operates independently of telephonic or internet reception, though these technologies can enhance the usefulness of the GPS positioning information.

A GPS navigation device, GPS receiver, or simply GPS is a device that is capable of receiving information from GPS satellites and then to calculate the device's geographical position. The GPS capability of smartphones may use assisted GPS (A-GPS) technology, which can use the base station or cell towers to provide a faster Time to First Fix (TTFF), especially when GPS signals are poor or unavailable. Almost all smartphones now incorporate GPS receivers.

Metadata is data that provides information about other data, i.e., data about data. Metadata has various purposes, such as helping users find relevant information and discover resources. Metadata also can helps organize electronic resources, provide digital identification, and archive and preserve resources. Many distinct types of metadata exist, including descriptive metadata, structural metadata, administrative metadata, reference metadata and statistical metadata.

Descriptive metadata is descriptive information about a resource, used for discovery and identification. Descriptive metadata includes elements such as title, abstract, author, and keywords. Structural metadata is metadata about containers of data and indicates how compound objects are put together (e.g., how pages are ordered to form chapters). Structural metadata describes the types, versions, relationships and other characteristics of digital materials. Administrative metadata is information to help manage a resource (e.g., resource type, permissions, and when and how a resource was created). Reference metadata is information about the contents and quality of statistical data. Statistical metadata, also called process data, may describe processes that collect, process, or produce statistical data.

SUMMARY

Aspects of the present invention disclose a method, computer program product, and system for providing a location service. The method includes one or more processors identifying a first user performing a defined interaction on a computing device. The method further includes one or more processors determining a location of the computing device during the defined interaction. The method further includes one or more processors recording the determined location. The method further includes one or more processors receiving a request for location information associated with the first user from a second user. The second user is authorized to access location information associated with the first user. In response to receiving the request from the second user, the method further includes one or more processors determining a current location of the computing device. The method further includes one or more processors generating a location status message corresponding to the first user based on the determined current location in relation to the recorded location.

DETAILED DESCRIPTION

Embodiments of the present invention allow for an enhanced location service that utilizes defined interactions by a user with a computing device to derive location information corresponding to the user. Embodiments of the present invention identify when a user performs a defined interaction with a computing device (e.g., send a message, actively utilize an application, etc.) and record a location corresponding to the user interaction. Embodiments of the present invention maintain a database of verified user location data and a database of authorized users, which the user has authorized to access location data of the user. In response to receiving a location request from an authorized user, embodiments of the present invention determine current location information of the user and provide a corresponding status message to the authorized user.

Some embodiments of the present invention recognize that tracking device location utilizing a GPS is based on utilizing a continual stream of location data for the device. Embodiments of the present invention provide a method and system to determine a location of the computing device and the user when the user actively utilizes the computing device. Various embodiments of the present invention can provide advantages of reducing computing device usage and network usage for a location service through determining and recording location data on an as-requested basis. Further, embodiments of the present invention enable a system to provide access to location data for users that are authorized by the user requesting the location data and determining the location data based on customizable parameters (e.g., active interaction with a computing device).

Implementation of embodiments of the invention may take a variety of forms, and exemplary implementation details are discussed subsequently with reference to the Figures.

Figure 1:
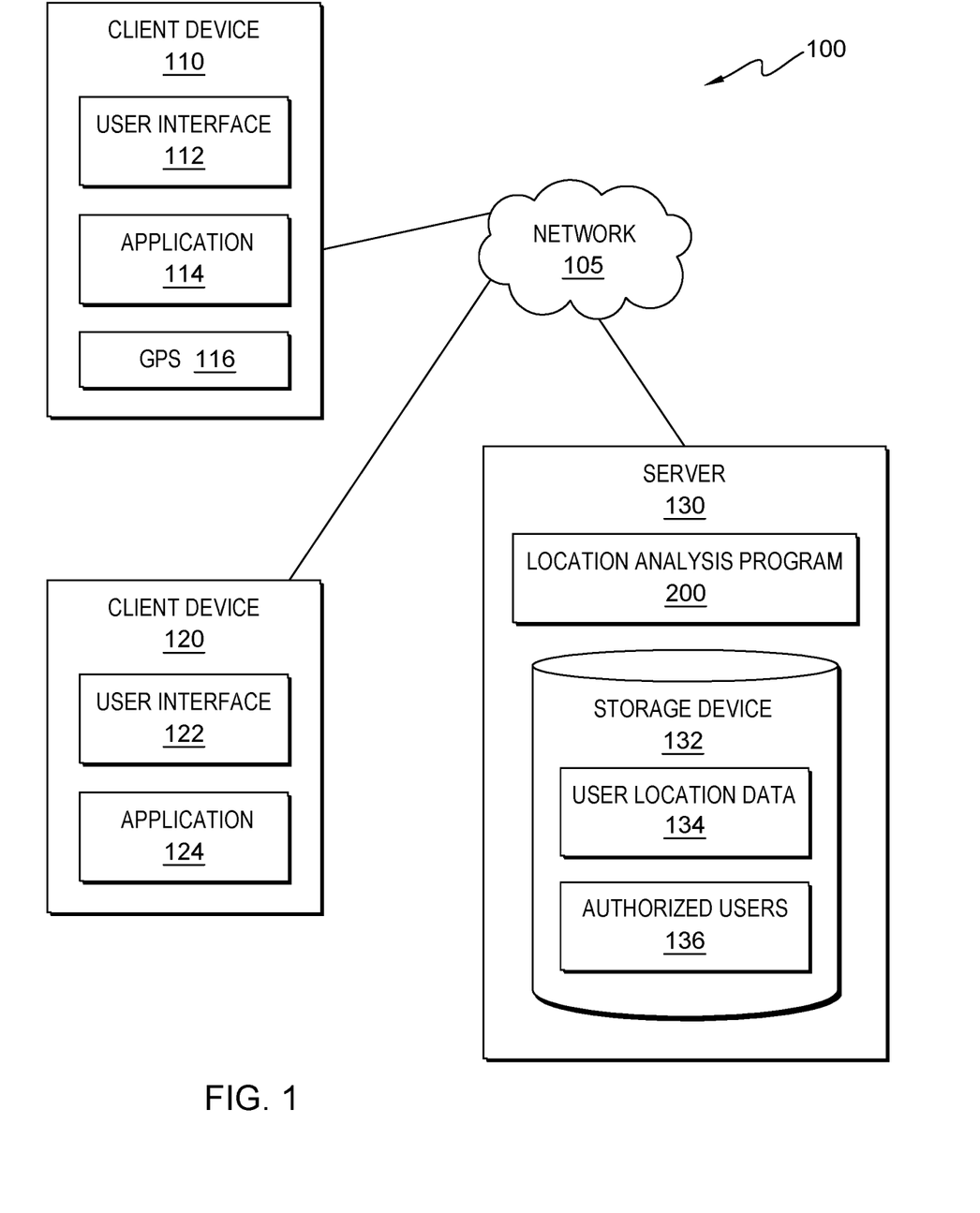
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, and server 130, all interconnected over network 105. In an example embodiment, server 130 provides location services to devices accessible over network 105, such as client device 110 and client device 120. In various embodiments, client device 110 and client device 120 are representative of are representative of computing devices that users can utilize, in accordance with embodiments of the present invention. For example, client device 120 is associated with a user that is authorized to receive information regarding a location of client device 110 (e.g., based on user preference). In this example, server 130 can identify and record the location of client device 110 and provide corresponding information to client device 120, in accordance with embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, and server 130, in accordance with embodiments of the present invention. In various embodiments, network 105 facilitates communication among a plurality of networked computing devices (e.g., client device 110, client device 120, and server 130), corresponding users (e.g., respective users of client device 110 and client device 120), and corresponding management services (e.g., server 130).

In various embodiments of the present invention, client device 110 and client device 120 may be a workstation, personal computer, personal digital assistant, mobile phone, or any other device capable of executing computer readable program instructions, in accordance with embodiments of the present invention. In general, client device 110 and client device 120 are representative of any electronic device or combination of electronic devices capable of executing computer readable program instructions. Client device 110 and client device 120 may include components as depicted and described in further detail with respect to FIG. 3, in accordance with embodiments of the present invention. In an example embodiment, client device 110 is a smartphone.

Client device 110 includes user interface 112, application 114, and Global Positioning System (GPS) 116. User interface 112 is a program that provides an interface between a user of client device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of a service or enterprise associated with server 130. In another example embodiment, application 114 is a web browser that an individual utilizing client device 110 utilizes (e.g., via user interface 112) to access and provide information over network 105. For example, a user of client device 110 utilizes user interface 112 to input text of message to send to another user via application 116 and network 105. In other aspects of the present invention, application 114 can be representative of applications that provide additional functionality (e.g., camera, messaging, etc.), in accordance with various aspects of the present invention.

GPS 116 can be representative of a GPS receiver, located on client device 110, for utilization in accordance with various embodiments of the present invention. In additional embodiments, GPS 116 can be representative of any combination of hardware and software components that can determine a geographic location of client device 110, in accordance with embodiments of the present invention. In an example embodiment, server 130 can utilize location data provided by GPS 116 to derive a location of a user utilizing client device 110. In another embodiment, client device 110 can provide network connectivity data to server 130 (e.g., in addition to data from GPS 116) for utilization in determining a location of client device 110, in accordance with embodiments of the present invention.

Client device 120 includes user interface 122 and application 124. The respective instances of user interface 122 and application 124 include functionality as described above, with regard to respective instances of user interface 112 and application 114 (with respect to client device 110). In an example embodiment, client device 120 is a computing device that is associated with a user that is authorized to access location data of a user of client device 110 (i.e., an authorized user of authorized users 136), in accordance with various embodiments of the present invention.

In example embodiments, server 130 can be a desktop computer, a computer server, or any other computer systems, known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 110 and client device 120). In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes location analysis program 200 and storage device 132, which includes user location data 134 and authorized users 136. In example embodiments, location analysis program 200 provides a location service, accessible to authorized users, in accordance with embodiments of the present invention. In various embodiments, location analysis program 200 identifies a user performing a defined interaction on a computing device (e.g., send a message, actively utilize an application, etc.) and record a location of the computing device corresponding to the user interaction. In response to receiving a location request from an authorized user (e.g., a user of client device 120), location analysis program 200 determines current location information of the user and provide a corresponding status message to the authorized user.

Figure 3:
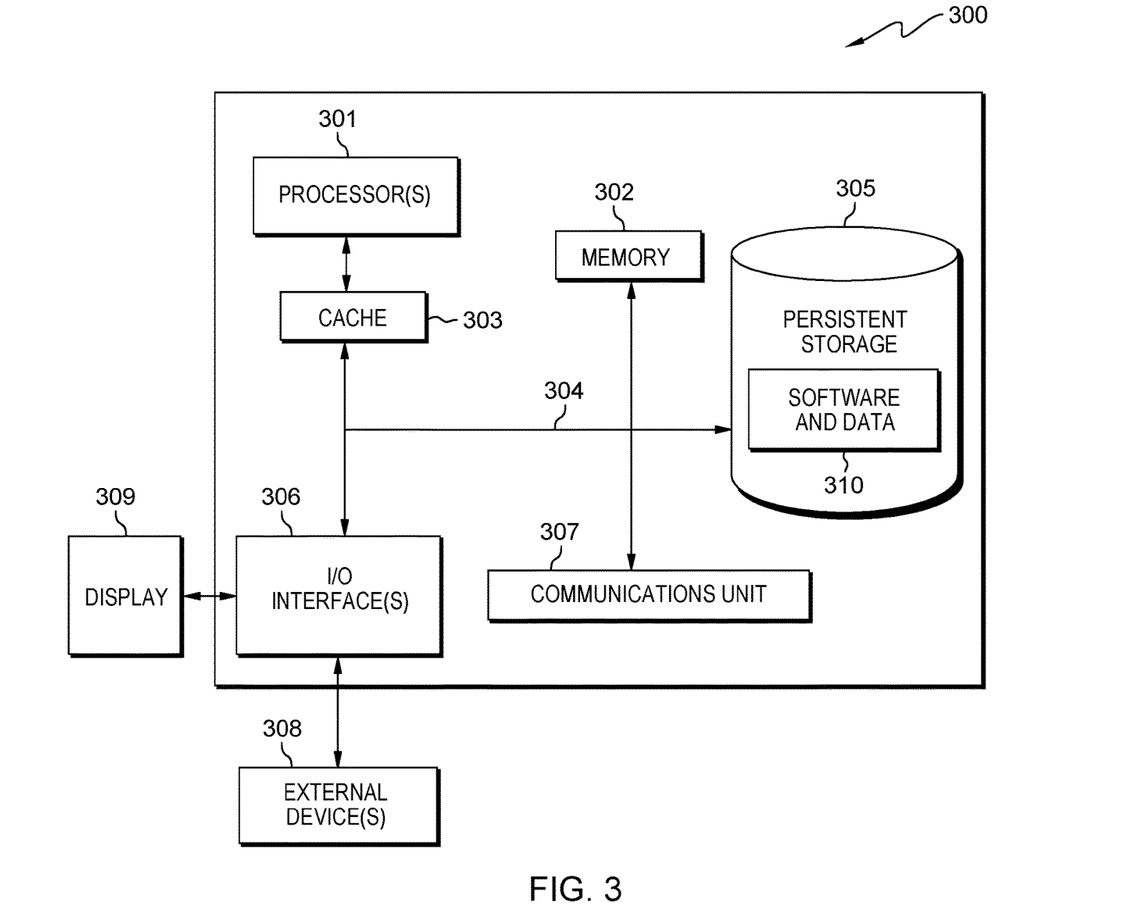
FIG. 3 depicts a block diagram of components of a computing system representative of the client devices and server of FIG. 1, in accordance with an embodiment of the present invention.

In various embodiments, server 130 utilizes storage device 132 to store encrypted information associated with users of a service or application managed by server 130, such as user location data 134 and authorized user. Storage device 132 can be implemented with any type of storage device, for example, persistent storage 305, which is capable of storing data that may be accessed and utilized by server 130, client device 110 and client device 120, such as a database server, a hard disk drive, or a flash memory. In other embodiments, storage device 132 can represent multiple storage devices and collections of data within server 130. In various embodiments, storage device 132 includes information that location analysis program 200 can access and utilize, in accordance with embodiments of the present invention. In further embodiments, storage device 132 includes information associated with users that are registered with location analysis program 200.

In various embodiments of the present invention, the user of client device 110 registers with server 130 (e.g., via a corresponding application). For example, the user completes a registration process, provides information, and authorizes the collection and analysis (i.e., opts-in) of relevant data on at least client device 110, by server 130 (e.g., user profile information, user contact information, location information, network connection information, user preferences, or types of information, for server 130 utilize with location analysis program 200). In various embodiments, a user can opt-in or opt-out of certain categories of data collection. For example, the user can opt-in to provide all requested information, a subset of requested information, or no information.

In one example scenario, the user opts-in to provide a first category of information but opts-out of providing a second category of information, such as user authentication information (on all or a subset of client device 110, or other devices associated with the user (not shown)). In another embodiment, a user of client device 110 can define which information that server 130 will store and utilize during and associated with a location service, in accordance with embodiments of the present invention. In various embodiments, the user of client device 110 has authorized server 130 to determine and record location data of client device 110 (e.g., in user location data 134) and store a listing of authorized users (e.g., in authorized users 136) for utilization by server 130 and location analysis program 200 in accordance with embodiments of the present invention.

In additional embodiments, storage device 132 also stores preference data, such as indications and definitions of defined interactions, for server 130 to utilize in operation of location analysis program 200. For example, storage device 132 can indicate that a defined interaction is a user utilizing client device 110 actively interact with another user. In an example scenario, a user utilizing client device 110 to send a message to another user via a messaging application on client device 110 (e.g., application 114) is performing a defined interaction, per preferences of storage device 132. In this example, a user refreshing a web browser on client device 110 is defined as not representative of a user performing a defined interaction.

In an alternate embodiment, storage device 132 can indicate that any indication of the user actively utilizing client device 110 is a defined interaction (e.g., opening application 114 and entering authentication credentials). In further embodiments, storage device 132 can define preferences of location analysis program 200 to utilize any relevant form of activity of a user of client device 110 as a defined interaction, in accordance with various embodiments of the present invention.

In example embodiments, server 130 (e.g., utilizing location analysis program 200) record determined locations of a registered user (e.g., the user of client device 110) in user location data 134, in accordance with embodiments of the present invention. In various embodiments, location analysis program 200 retrieves location information from GPS 116 of client device 110 and stores the retrieved information in user location data 134 associated with the user of client device 110.

In another embodiment, location analysis program 200 can capture metadata associated with a defined interaction of a user with client device 110 and store the metadata (or location information derived from the metadata) in user location data 134, associated with the user. In various embodiments, location information stored in user location data 134 can include a geographic location (e.g., coordinates, an indication of a particular location, such as a building or geofenced area, etc.), an indication of a wireless network connection of client device 110, or other relevant indication of device location, in accordance with embodiments of the present invention.

In example embodiments, authorized users 136 includes a listing of users that a registered user (e.g., user of client device 110) has authorized to access location information associated with the registered user. In various embodiments, authorized users 136 can include indications of users and devices associated with users, as defined at the preference of the user of client device 110. In additional embodiments, location analysis program 200 can utilize authorized users 136 to determine whether a user that is requesting to access location information is a user that is authorized to access (e.g., receive a message indication a user location) the requested location information, in accordance with various embodiments of the present invention.

In an example scenario, the user of client device 110 is registered with server 130 and location analysis program 200 and authorizes a list of specific users (e.g., family members, etc.) and corresponding contact information for the authorized users. Server 130 stores the indicated authorized users and contact information in authorized users 136, associated with the user of client device 110. In this example scenario, the user of client device 110 defines that the user of client device 110 is an authorized user.

Figure 2:
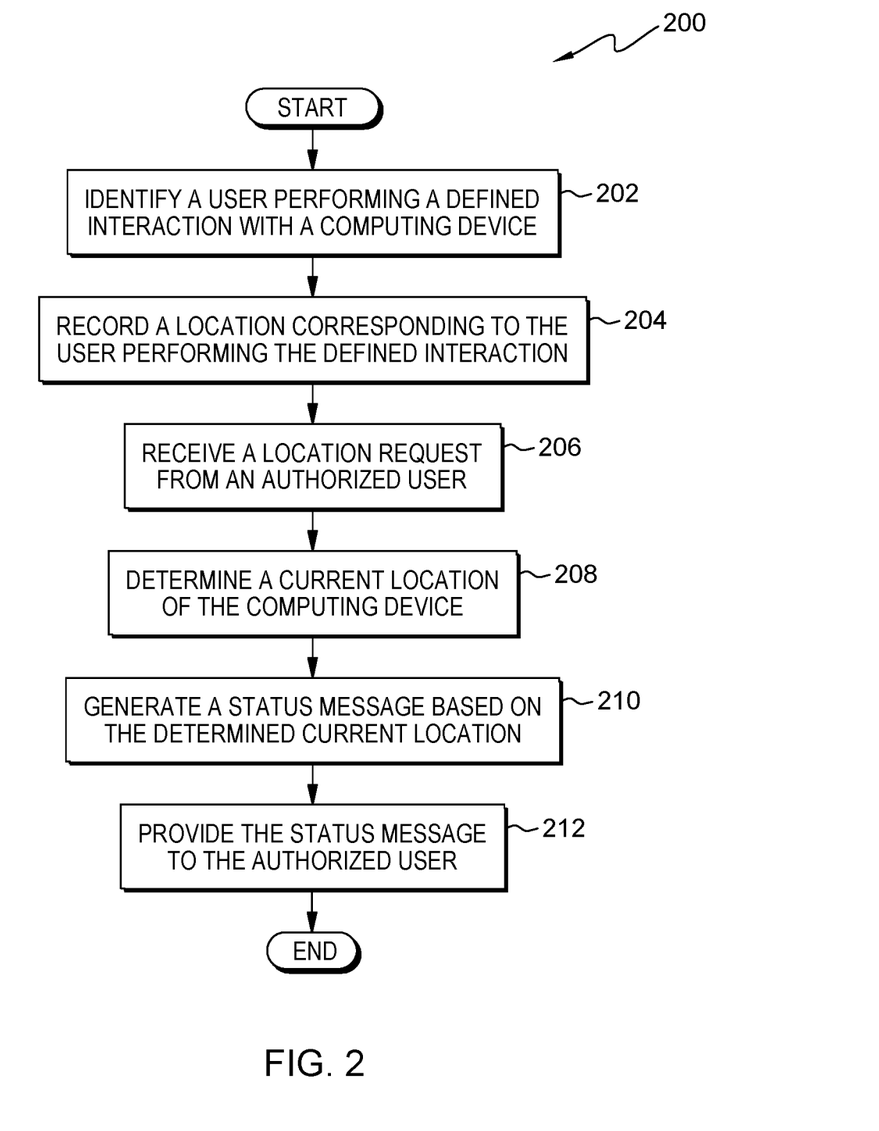
FIG. 2 is a flowchart depicting operational steps of a program for providing a location service, with data available to authorized users, in accordance with embodiments of the present invention.

FIG. 2 is a flowchart depicting operational steps of location analysis program 200, a program for providing a location service, with data available to authorized users, in accordance with embodiments of the present invention. In one embodiment, location analysis program 200 monitors activity of a user on a computing device (e.g., a user on client device 110) for an indication of the user interacting with the computing device. For example, location analysis program 200 initiates in response to determining that the user is interacting with client device 110. In another embodiment, location analysis program 200 initiates in response to a request from a user to initiative. In various embodiments, a user defines when location analysis program 200 can monitor activity on client device 110 (e.g., in user data usage preferences provided during registration).

In step 202, location analysis program 200 identifies a user performing a defined interaction with a computing device. In one embodiment, location analysis program 200 identifies that a user of client device 110 performs a defined interaction with client device 110, based on definitions in storage device 132. For example, storage device 132 can indicate that a defined interaction is a user utilizing client device 110 actively interact with another user. In an example scenario, a user utilizing client device 110 to send a message to another user via a messaging application on client device 110 (e.g., application 114) is performing a defined interaction, per preferences of storage device 132. In this example, a user refreshing a web browser on client device 110 is defined as not representative of a user performing a defined interaction. In further embodiments, location analysis program 200 can utilize any form of identifiable interaction with client device 110 (e.g., entering authentication credentials to application 114) that is defined by the user and/or system (e.g., server 130), in accordance with embodiments of the present invention.

In an example embodiment, location analysis program 200, while monitoring user activity on client device 110, identifies that the user utilizes client device 110 to send a text message to another user. Accordingly, location analysis program 200 identifies that the user of client device 110 is performing a defined interaction (i.e., utilizing client device 110 to actively interact with another individual). In additional embodiments, location analysis program 200 can reinitiate processing at step 202 each time a user performs a defined interaction with a computing device.

In step 204, location analysis program 200 records a location corresponding to the user performing the defined interaction. In one embodiment, location analysis program 200 determines a location corresponding to the user performing the defined interaction on client device 110 (in step 202) and stores the determined location in user location data 134. Location analysis program 200 can determine a location of client device 110 utilizing a variety of processes, such as GPS 116 of client device 110, wireless network information of client device 110, etc.

In an example embodiment, location analysis program 200 collects metadata from client device 110 when the user performs the defined interaction (identified in step 202). For example, location analysis program 200 can collect metadata, based on user preferences and permissions, indicating wireless network connectivity information (e.g., a most recently or currently connected wireless network, nearby wireless networks, etc.), nearby computing devices (e.g., devices accessible over a wireless personal area network (WPAN) or other form of network communication associated with network 105), GPS data (e.g., from GPS 116, an indication of a particular location, such as a building or geofenced area, etc.), or other form of metadata. In an example scenario, location analysis program 200 captures metadata associated with a user sending a message to another user via client device 110 (i.e., performing the defined interaction of step 202).

In various embodiments, location analysis program 200 can derive a location of the user (and the corresponding computing device) from collected metadata associated with the performed interaction. For example, location analysis program 200 can analyze GPS data and wireless network information in the metadata to determine a geographic location and wireless network as the location corresponding to the defined interaction. Accordingly, location analysis program 200 can store the determined geographic location (e.g., a geographic location and/or wireless network) in user location data 134. In additional embodiments, client device 110 can upload location metadata and information to server 130. In another embodiment, client device 110 can record and store location metadata and information locally on client device 110.

In an example scenario, the user of client device 110 is attending a conference and during a break, the user utilizes client device 110 to send a message (e.g., text message, voice message or call, etc.) to a family member. In this example scenario, location analysis program 200 determines that the interaction of sending the message is a defined interaction (step 202) and determines a location corresponding to the interaction. Location analysis program 200 can then record the determined location in user location data 134. For example, location analysis program 200 records the determined geographic location, derived from GPS 116 of client device 110, the associated wireless network (e.g., the wireless network of the conference), and other information from the metadata that is relevant to device location (e.g., nearby devices, etc.) in user location data 134, associated with the user of client device 110. In additional embodiments, location analysis program 200 can record the determined location in user location data 134 with a corresponding identifier (e.g., "safe," "most recent," "verified location," etc.).

In step 206, location analysis program 200 receives a location request from an authorized user. In one embodiment, location analysis program 200 received a request for location information associated with the user of client device 110 from the user of client device 110. In this embodiment, location analysis program 200 determines whether the user of client device 120 is indicated as an authorized user in authorized users 136. In response to determining that the user of client device 120 is included in a list of authorized users in authorized users 136, associated with the user of client device 110. In various embodiments, authorized users 136 can include indications of users and devices associated with users, as defined at the preference of the user of client device 110. In additional embodiments, location analysis program 200 can utilize authorized users 136 to determine whether a user that is requesting to access location information is a user that is authorized to access (e.g., receive a message indication a user location) the requested location information, in accordance with various embodiments of the present invention.

In an alternate embodiment, if location analysis program 200 determines that a requesting user is not indicated in authorized users 136, then location analysis program 200 does not retrieve or determine location information for the requesting user. In a further aspect, location analysis program 200 can notify the user of client device 110 of the request from the unauthorized individual.

In one embodiment, after performing step 204, location analysis program 200 waits until receipt of a location request from an authorized user (i.e., waits to perform step 206). In another embodiment, location analysis program 200 can reinitiate at step 206 in response to receiving a location request from an authorized user. In a further embodiment, location analysis program 200 can return to step 202 in response to determining that the user has performed another defined interaction with computing device 110. For example, if location analysis program 200 determines that the user of client device 110 is actively interacting with client device 110, before location analysis program 200 receives a location request from an authorized user, the location analysis program 200 returns to perform the processing of step 202.

In step 208, location analysis program 200 determines a current location of the computing device. In one embodiment, location analysis program 200 determines a current location of client device 110 (i.e., the computing device that the user performs the defined interaction on in step 202). In various embodiments, location analysis program 200 acquires updated metadata from client device 110 to derive information relevant to a current location. For example, location analysis program 200 can collect metadata, based on user preferences and permissions, indicating wireless network connectivity information (e.g., a most recently or currently connected wireless network, nearby wireless networks, etc.), nearby computing devices (e.g., devices accessible over a wireless personal area network (WPAN) or other form of network communication associated with network 105), GPS data (e.g., from GPS 116, an indication of a particular location, such as a building or geofenced area, etc.), or other form of metadata.

Location analysis program 200 can utilize various techniques and processes for determining a current location of the computing device, such as, but not limited to, polling or querying the computing device for current location information (e.g., relevant metadata, data from GPS 116, connected wireless networks, nearby devices, etc.), send a request for location information to the computing device, query the user of the computing device for an update/interaction, retrieve current location metadata, etc. In another embodiment, location analysis program 200 can receive a metadata comparison for determining a change in a location of the computing device. For example, location analysis program 200 received information indicating which data points within the metadata has changed relative to metadata of step 202.

In the previously discussed example scenario, the user of client device 110 is attending a conference and location analysis program 200 identifies the user performing a defined interaction at the location of the conference (in step 202) and records the determined location in user location data 134 (step 204). After receiving a location request from the user of client device 120 for the user of client device 110, location analysis program 200 verifies (in step 206) that the user of client device 120 is an authorized user (i.e., the user is indicated in authorized users 136). Then, location analysis program 200 determines a current location of the user utilizing client device 110. For example, location analysis program 200 determines updated location information (e.g., metadata) that includes a geographic location, derived from GPS 116 of client device 110, a current wireless network of client device 110, and available indications of nearby devices.

In further embodiments, location analysis program 200 can calculate a confidence associated with a location of the computing device (i.e., the higher the score, the higher the confidence in the corresponding information). In example embodiments, location analysis program 200 utilizes weights associated with respective location data points (e.g., from location metadata), based on a corresponding accuracy/reliability of the data point, to generate a confidence score for a determined location. For example, location data from a GPS is associated with a high weight, while nearby/connected wireless networks and nearby computing devices can be associated with a medium/low weight.

In an example, location analysis program 200 retrieves the current location metadata from client device 110 (in step 208). Location analysis program 200 can then compare the information in the current location metadata to information in the recorded location metadata of user location data 134 (from step 204) associated with an indicated previous location of the computing device. Then, location analysis program 200 can determine a confidence in the comparison of the sets of location metadata. For example, if location analysis program 200 determined the GPS coordinate data has not changed, then location analysis program 200 can calculate a high confidence (e.g., "high," 100%, etc.) that the computing device is in the same location (if a few meters away, 99%, etc.). Further, if location analysis program 200 determines that the wireless network has not changes, then location analysis program 200 can calculate a medium confidence. In an alternate example, if location analysis program 200 determines that the GPS data indicates that the computing device is in another building (geofenced area, etc.), then location analysis program 200 can determine a high confidence that the location of the computing devices has changed.

In step 210, location analysis program 200 generates a status message based on the determined current location. In one embodiment, location analysis program 200 generates a location status message that indicates whether the location of the user has changed from the recorded location of step 204. In example embodiments, location analysis program 200 generates a status message that includes content based on user preferences (e.g., of the user of client device) indicating types of information to include in the message (e.g., to include a specific location, or whether the location has changed or remained unchanged, include corresponding location confidence, etc.).

In the previously discussed example scenario of the user of client device 110 attending a conference, location analysis program 200 determines that the current location (from step 208) of client device 110 is the same as the recorded location in user location data 134 (from step 204). Accordingly, location analysis program 200 generates a status message indicating that the location of client device 110 has not changed (e.g., based on unchanged or similar GPS data, wireless network data, etc.). In an alternative of the example scenario, if location analysis program 200 determines that the current location (from step 208) of client device 110 is different from the recorded location in user location data 134 (from step 204), then location analysis program 200 generates a status message indicating that the location of client device 110 has changed. In a further aspect, location analysis program 200 can generate the status message to include an indication of the current location of client device 110 (e.g., based on user preference data).

In step 212, location analysis program 200 provides the status message to the authorized user. In one embodiment, location analysis program 200 provides the status message (generated in step 212) to the authorized user that provided the location request (received in step 206). In the previously discussed example scenario of the user of client device 110 attending a conference, location analysis program 200 received (in step 206) a location request from the user of client device 120 and determined that the user of client device 120 is an authorized user (based on authorized users 136). Accordingly, location analysis program 200 generates a status message (in step 210) indicating that the location of client device 110 has not changed (e.g., based on unchanged or similar GPS data, wireless network data, etc.) and then sends the generated status message to the user of client device 120, via network 105 (in step 212).

FIG. 3 depicts computer system 300, which is representative of client device 110, client device 120, and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/ output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 110, software and data 310 includes user interface 112, application 114, and GPS 116. With respect to client device 120, software and data 310 includes user interface 122 and application 124. With respect to server 130, software and data 310 includes location analysis program 200, user location data 134, and authorized users 136.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

identifying, by one or more processors, a first user performing a defined interaction on a computing device;

determining, by one or more processors, a location of the computing device during the defined interaction;

recording, by one or more processors, the determined location;

receiving, by one or more processors, a request for location information associated with the first user from a second user, wherein the second user is authorized to access location information associated with the first user;

in response to receiving the request from the second user, determining, by one or more processors, a current location of the computing device, wherein determining the current location of the user further comprises:

capturing, by one or more processors, metadata from the computing device, the metadata including location information of the computing device at a time that corresponds to the received request from the second user;

determining, by one or more processors, whether the computing device has changed locations based on a comparison of the captured metadata, from the time that corresponds to the received request from the second user, and metadata of the recorded location of the computing device during the defined interaction; and generating, by one or more processors, a location status message corresponding to the first user based on the determined current location in relation to the recorded location, indicating whether the computing device has changed locations.

2. The method of claim 1, wherein the defined interaction includes the first user utilizing the computing device to interact with another user.

3. The method of claim 1, wherein receiving the request for location information associated with the first user from the second user further comprises:

determining, by one or more processors, whether the second user is included in a listing of authorized users defined by the first user.

4. The method of claim 1, further comprising:

providing, by one or more processors, the generated location status message to the second user.

5. The method of claim 1, further comprising:
in response to recording the determined location, waiting, by one or more processors, an action selected from the group consisting of: (i) receipt of a request for location information associated with the first user from another user, and (ii) an indication that the first user is performing another defined interaction on the computing device.

6. The method of claim 1, wherein determining whether the computing device has changed locations based on the comparison further comprises:
determining, by one or more processors, a confidence in the current location in the computing device based on changes between the captured metadata, from the time that corresponds to the received request from the second user, and the metadata of the recorded location of the computing device during the defined interaction.

7. The method of claim 1, wherein determining whether the computing device has changed locations based on the comparison further comprises:
receiving, by one or more processors, information indicating which data points within the captured metadata, from the time that corresponds to the received request from the second user, have changed relative to the metadata of the recorded location of the computing device during the defined interaction.

8. The method of claim 1, wherein location information in the captured metadata, from the time that corresponds to the received request from the second user, and the metadata of the recorded location of the computing device during the defined interaction, include a respective location of the computing device derived from global positioning system (GPS) data.

9. The method of claim 1, wherein location information in the captured metadata, from the time that corresponds to the received request from the second user, and the metadata of the recorded location of the computing device during the defined interaction, include a respective location of the computing device derived from one or more wireless networks connected to the computing device.

10. The method of claim 1, wherein location information in the captured metadata, from the time that corresponds to the received request from the second user, and the metadata of the recorded location of the computing device during the defined interaction, include respective indications of nearby computing devices to the computing device.

11. A computer program product comprising:
one or more computer readable storage media and program instructions stored on the one or more computer readable storage media, the program instructions comprising:
program instructions to identify a first user performing a defined interaction on a computing device;
program instructions to determining, by one or more processors, a location of the computing device during the defined interaction;
program instructions to record the determined location;
program instructions to receive a request for location information associated with the first user from a second user, wherein the second user is authorized to access location information associated with the first user;
in response to receiving the request from the second user, program instructions to determine a current location of the computing device, wherein determining the current location of the user further comprise program instructions to:
capture metadata from the computing device, the metadata including location information of the computing device at a time that corresponds to the received request from the second user;
determine whether the computing device has changed locations based on a comparison of the captured metadata, from the time that corresponds to the received request from the second user, and metadata of the recorded location of the computing device during the defined interaction; and
program instructions to generate a location status message corresponding to the first user based on the determined current location in relation to the recorded location, indicating whether the computing device has changed locations.

12. The computer program product of claim 11, wherein the defined interaction includes the first user utilizing the computing device to interact with another user.

13. The computer program product of claim 11, wherein the program instructions to receive the request for location information associated with the first user from the second user further comprises program instructions to:
determine whether the second user is included in a listing of authorized users defined by the first user.

14. A computer system comprising:
one or more computer processors;
one or more computer readable storage media; and
program instructions stored on the computer readable storage media for execution by at least one of the one or more processors, the program instructions comprising:
program instructions to identify a first user performing a defined interaction on a computing device;
program instructions to determining, by one or more processors, a location of the computing device during the defined interaction;
program instructions to record the determined location;
program instructions to receive a request for location information associated with the first user from a second user, wherein the second user is authorized to access location information associated with the first user;
in response to receiving the request from the second user, program instructions to determine a current location of the computing device, wherein determining the current location of the user further comprise program instructions to:
capture metadata from the computing device, the metadata including location information of the computing device at a time that corresponds to the received request from the second user;
determine whether the computing device has changed locations based on a comparison of the captured metadata, from the time that corresponds to the received request from the second user, and metadata of the recorded location of the computing device during the defined interaction; and
program instructions to generate a location status message corresponding to the first user based on the determined current location in relation to the recorded location, indicating whether the computing device has changed locations.

15. The computer system of claim 14, wherein the defined interaction includes the first user utilizing the computing device to interact with another user.

16. The computer system of claim 14, wherein the program instructions to receive the request for location information associated with the first user from the second user further comprises program instructions to:

determine whether the second user is included in a listing of authorized users defined by the first user.

17. The computer system of claim 14, further comprising program instructions, stored on the computer readable storage media for execution by at least one of the one or more processors, to:

provide the generated location status message to the second user.

\* \* \* \* \*